US 7,818,173 B2

(12) United States Patent
Manabe et al.

(10) Patent No.: US 7,818,173 B2
(45) Date of Patent: Oct. 19, 2010

(54) INFORMATION RETRIEVAL SYSTEM, METHOD, AND PROGRAM

(75) Inventors: Toshihiko Manabe, Kamakura (JP); Hideki Tsutsui, Yokohama (JP); Koji Urata, Kawasaki (JP); Mika Fukui, Tokyo (JP); Hiroko Hayama, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1190 days.

(21) Appl. No.: 11/230,540

(22) Filed: Sep. 21, 2005

(65) Prior Publication Data
US 2006/0173682 A1 Aug. 3, 2006

(30) Foreign Application Priority Data
Jan. 31, 2005 (JP) ............................... 2005-024360

(51) Int. Cl.
*G10L 15/00* (2006.01)
*G10L 15/04* (2006.01)
*G06F 17/27* (2006.01)

(52) U.S. Cl. ..................... 704/257; 704/9; 704/251; 704/E15.045

(58) Field of Classification Search .................. 704/7, 704/235, 257, 9, 251, E15.045; 707/3–5, 707/999.003–999.005
See application file for complete search history.

(56) References Cited

U.S. PATENT DOCUMENTS

2001/0039493 A1* 11/2001 Pustejovsky et al. ........ 704/235
2004/0254917 A1* 12/2004 Brill et al. .................... 707/3
2005/0143999 A1* 6/2005 Ichimura .................. 704/251

FOREIGN PATENT DOCUMENTS

| JP | 10-240739 | * | 9/1998 |
| JP | 2000-276482 | | 10/2000 |
| JP | 2002-63209 | | 2/2002 |
| JP | 2003-85197 | | 3/2003 |

OTHER PUBLICATIONS

Notification of Reasons for Rejection, mailed on Sep. 16, 2008, from the Japanese Patent Office in Japanese Patent Application 2005-024360 and English translation thereof (10 pages).
Misu, et al., "Confirmation Strategy for Document Retrieval Systems with Spoken Dialog Interface", ICSLP, Graduate School of Informatics, Kyoto University, pp. 1-4, (2004).
Akiba, et al., "Effects of Language Modeling on Speech-driven Question Answering", ICSLP, pp. 1-4, arXiv:cs.CL/0407028 v1, (Jul. 10, 2004).

* cited by examiner

*Primary Examiner*—Angela A Armstrong
(74) *Attorney, Agent, or Firm*—Finnegan, Henderson, Farabow, Garrett & Dunner, L.L.P.

(57) ABSTRACT

An information retrieval system, includes speech recognition means for making speech recognition for a spoken question to generate first text information, generation means for modifying the first text information to generate second text information as a interrogative to make a search for an answer to the question, and search means for searching the answer from a document database by using the second text information.

6 Claims, 8 Drawing Sheets

110

| Interrogative term | Search term | Search term | Interrogative term |
|---|---|---|---|
| How many | → Plate, steam, etc. | Plate → | How many, how many minutes, How many hours, etc. |
| How many minutes | → Plate, steam, bacon, etc. | Oven → | How many minutes, etc. How many hours, etc. |
| How many hours | → Plate, oven, etc. | Bacon → | How many minutes, etc. How much |
| How much | → Bacon, spaghetti, etc. | | |
| ⋮ | | ⋮ | |

| Word string | Accessory | Milk | Plate | Now many | Might |
|---|---|---|---|---|---|
| Next candidate | Access | Mill | Plait | Name | May |
| | Accelerant | Mild | Platinum | How many | Maybe |
| | | Steam | | How many minutes | |

INFORMATION RETRIEVAL SYSTEM, METHOD, AND PROGRAM

CROSS-REFERENCE TO RELATED APPLICATIONS

This application is based upon and claims the benefit of priority from prior Japanese Patent Application No. 2005-024360, filed Jan. 31, 2005, the entire contents of which are incorporated herein by reference.

BACKGROUND OF THE INVENTION

1. Field of the Invention

The present invention relates to an information retrieval system, method, and program for searching an answer to a spoken question.

2. Description of the Related Art

Conventionally, there has been proposed a number of question answering systems for a spoken question from a user and displaying a result of such a search or outputting the result by speech synthesis. In such a system, in general, an answer is generated by using a problem solution knowledge (database) which has been prepared in advance. In such a question answering system, in the case where an inputted question is ambiguous, it is difficult to generate an answer which the user wants to obtain.

There has been proposed a contrivance of making an additional question to the user if such an ambiguous question occurs and obtaining an answer to such an additional question from the user, thereby eliminating ambiguousness. For example, in Jpn. Pat. Appln. KOKAI Publication No. 2002-63209, there is described an information processing apparatus for: maintaining a candidate list having contents registered therein; calculating similarity of the contents registered in that candidate list based on a search condition inputted from another device; in the case where the calculated similarity is smaller than a predetermined threshold value, deleting the corresponding contents from the candidate list; in the case where a total number of contents remaining in the candidate list is equal to or greater than a predetermined number, presenting a question item to such another device; and further calculating the similarity of contents based on an additional search condition inputted from such another device.

In addition, in the conventional system, there has been conducted a research and development of a question answering type search for analyzing text information which is a question of a natural language sentence and searching a required answer from a document database based on a result of the analysis. This question answering type search is different from a general document search in that answers of questions are presented without any excess or shortage instead of being presented in units of documents. For example, an answer "3,776 m" to a question that "how high is Mt. Fuji?" is obtained.

Conventionally, in order to achieve a question answering for a spoken question, first, the spoken question must be converted to text information by means of speech recognition processing. However, in a question answering system for making a search from a document database, it is very difficult to cope with a case in which a speech recognition error occurs.

In the case where a search is made for a document by a spoken question of a natural language sentence, even if a speech recognition error is included in such a question, a search can be made for a document from a correctly recognized portion. However, in the question answering type search for making a search from the document database, if a recognition error occurs with a portion of an interrogative expression (such as how many meters or how many kilograms) for estimating an answer (type of answer such as length or weight), a search cannot be made for a proper answer.

BRIEF SUMMARY OF THE INVENTION

According to one aspect of the present invention, an information retrieval system comprises: speech recognition means for making speech recognition for a spoken question to generate first text information; generation means for modifying the first text information to generate second text information as a interrogative to make a search for an answer to the question; and search means for searching the answer from a document database by using the second text information.

According to another aspect of the present invention, an information retrieval method comprises: making speech recognition for a spoken question to generate first text information; modifying the first text information to generate second text information as a interrogative to make a search for an answer to the question; and searching the answer from a document database by using the second text information.

DETAILED DESCRIPTION OF THE INVENTION

Hereinafter, preferred embodiments of the present invention will be described with reference to the accompanying drawings.

First Embodiment

Figure 1:
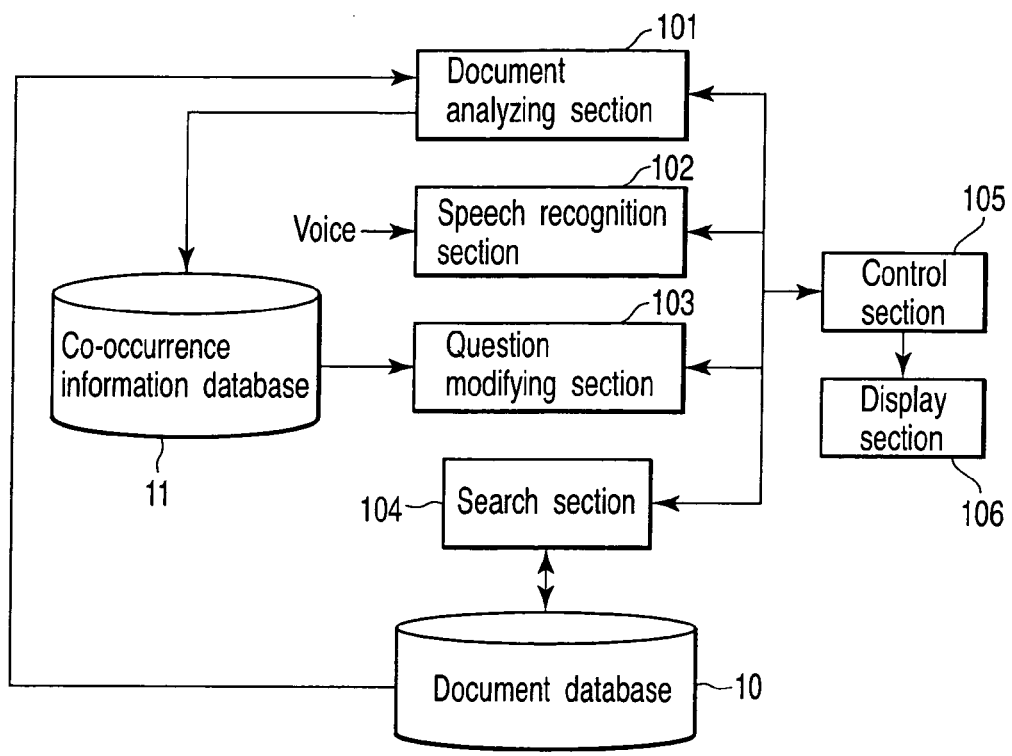
FIG. 1 is a block diagram depicting an information retrieval system according to a first embodiment of the present invention.

FIG. 1 is a block diagram depicting an information retrieval system in accordance with a first embodiment of the present invention. The information retrieval system shown in FIG. 1 is provided as a system for speech-recognizing a spoken question from a user to convert the speech-recognized question to text information retrievaling an answer to a question based on the converted text information; and providing a result of the search to the user. In the information retrieval system, a co-occurrence relationship between a word which can be produced as a search term and an expression of a candidate which can be produced as an answer (answer candidate) is analyzed, by a document analyzing section 101, from among document data contained in a dedicated document database 10 having documents targeted for search registered in advance therein. Then, the document analyzing section 101 stores information on a co-occurrence information between an interrogative expression and a search term for introducing the answer candidate in a co-occurrence information database 11. The word "co-occurrence relationship" used here denotes a relationship that interrogative expressions appear at the same time in neighborhood. The information retrieval system searches an answer to a spoken question by using words which appear in the question from among these interrogative expressions and search terms.

A flow of processing operation in the information retrieval system will be described in detail. In the information retrieval system, a question sentence produced by a voice vocalized from the user is recognized by means of a speech recognition section 102, and the speech recognized question statement is converted to text information. The information converted to the text information is provided to a question modifying section 103. The question modifying section 103 analyzes the text information; selects the corresponding co-occurrence information from the co-occurrence information database 11; and adds an interrogative expression to the text information by using the co-occurrence information. The question modifying section 103 provides to a search section 104 the text information which includes the added interrogative expression. The search section 104 refers to the document database 10 based on the text information and added interrogative expression from the question modifying section 103, and searches an answer to a question from among the database. In addition, the search section 104 provides an answer to a control section 105. The answer is displayed at a display section 106 under the control of the control section 105. The control section 105 calls from the speech recognition section 102 to the display section 106 at a proper timing, and makes control according to the user operation.

Figure 3:
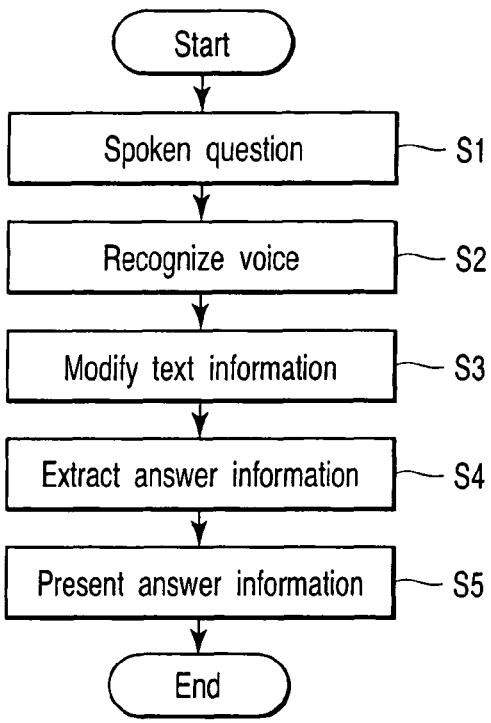
FIG. 3 is a flow chart showing a database search processing.

A description will be given in detail with respect to: a whole processing operation in the information retrieval system with reference to FIG. 3; a processing operation of the document analyzing section 101 with reference to FIGS. 4 to 6; and a processing operation of the question modifying section 103 with reference to FIGS. 8 to 10. In addition, a description will be given in detail with respect to co-occurrence information database 11 with reference to FIG. 7.

In this manner, in the information retrieval system, co-occurrence information is added to text information which is a speech recognition result and a search is made for an answer based on the co-occurrence information, whereby, even in the case where a recognition error occurs with a spoken question, a search is made for a proper answer, making it possible to provide the answer to the user.

Figure 2:
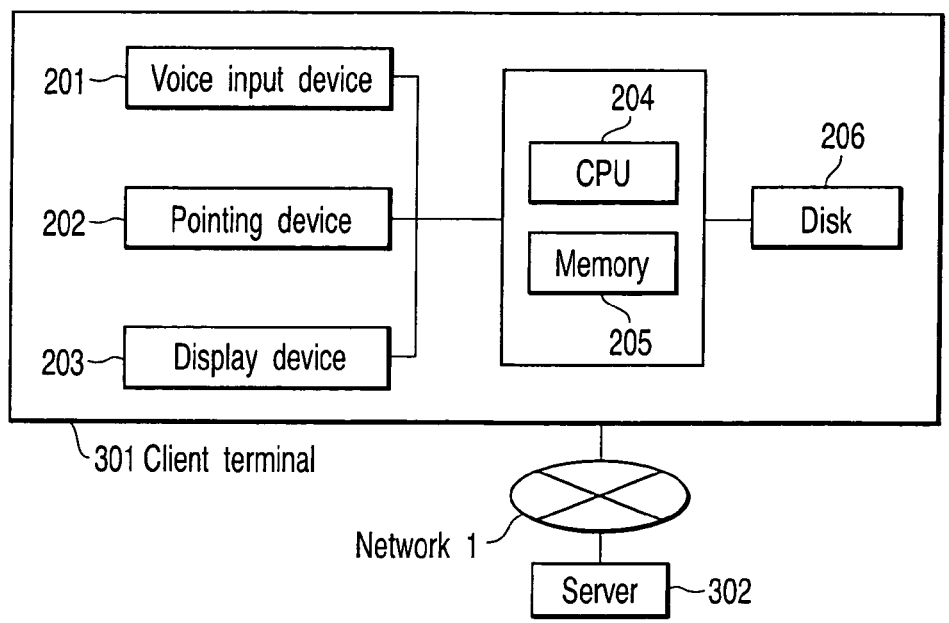
FIG. 2 is a view showing an application example of the information retrieval system.

Further, the information retrieval system shown in FIG. 1 can be achieved on a client terminal 301 such as a general personal computer (PC), as shown in FIG. 2. Hereinafter, a description will be given with respect to a processing operation executed in the information retrieval system in association with the configurations of FIGS. 1 and 2 will be described here. First, a program executed by the information retrieval system is installed in a disk 206, and is started up. The processing operations shown in FIG. 1 each are controlled by a CPU 204 which is the control section 105, whereby a database search processing is executed. Next, the speech recognition section 102 shown in FIG. 1 converts the spoken input through a voice input device 201 such as a microphone to text information. The control section 105 controls the start and end of the speech recognition processing or startup of a question answering processing in response to an operation on a screen using a pointing device 202 such as a mouse. In addition, the control section 105 causes a display device 203 corresponding to the display section 106 such as a display unit to display the results obtained at the speech recognition section 102, the question modifying section 103, and the search section 104. At the same time, in the case where the control section 105 controls each of the processing operations, data is temporarily stored in a memory 205.

Further, a processing operation of the information retrieval system or a database may be allocated to be distributed on a server 302 which is a server computer connected to its client terminal 301 via a network 1 as well as on the client terminal 301. For example, the speech recognition section 102 may be allocated so as to be executed by the client terminal 301. In addition, the document analyzing section 101, the question modifying section 103, the search section 104, the document database 10, and the co-occurrence information database 11 are allocated so as to be executed by the server 302. Further, the control section 105 and the display section 106 may be allocated so as to be executed by both of the client terminal 301 and the server 302.

For example, using a Web browser on the client terminal 301, the control section 105 operating on the client terminal 301 is described by Java Script (registered trademark). On the other hand, using a Web server compatible with JSP (Java Server Pages) on the server 302, the control section 105 operating on the server 302 is described by the JSP, and each section of FIG. 1 is packaged in a format which can be called from Java Script (registered trademark) or Java (registered trademark), whereby operations of calling them or exchanging data with each other, and displaying a result or the like can be achieved in a distributed environment.

In addition, the speech recognition section 102 carries out dictation of the spoken input by means of the voice input device 201 of FIG. 2, and displays text information which is a result of such dictation on the display device 203. A voice dictation processing or a result display processing can be externally controlled by means of commercially available dedicated software. The speech recognition section 103 uses such software.

Now, a description will be given with respect to a database search processing executed by the information retrieval system shown in FIG. 1. In FIG. 3, first, a voice for a question is inputted to the speech recognition section 102 (step S1). The speech recognition section 102 recognizes the inputted voice and converts the recognized voice to text information (step S2). The question modifying section 103 extracts co-occurrence information from the text information, and modifies the text information according to the co-occurrence information (step S3). The search section 104 searches an answer from the document database 10 based on the modified text information, and extracts the answer (step S4). The search section 104 provides the extracted answer to the control section 105. The control section 105 presents the display section 106 with the extracted answer (step S5).

In this way, a search is made for an answer based on the text information modified in accordance with the co-occurrence information, whereby, even in the case where a recognition error occurs with a voice input for a question, a search is made for a proper answer, and the answer can be provided to the user.

Now, a description will be given with respect to a document analyzing processing using the document analyzing section 101 with reference to FIGS. 4 to 6. In FIG. 4, first, the document analyzing section 101 searches an expression (search candidate) which can be produced as an answer to a question answering type search (step S10). Next, the document analyzing section 101 extracts a predetermined number of words at a predetermined interval before and after the searched answer candidate (step S11). For example, as shown in FIG. 5, in the case of example 1, a search is made for a unit expression such as an expression of "One" of "One steam plate" contained in text information (corresponding to step S10), and the predetermined preceding and succeeding words are extracted around that word (corresponding to step S11). In addition, in example 2, a search is made for a unit expression of "minutes" of "Heat it on the plate for 5 minutes" contained in text information, and the predetermined preceding and succeeding words are extracted around that word. A search may be made for a quantitative expression having a unit such as a length or a weight including m (meters), cm (centimeters), g (grams), and kg (kilograms). In this manner, by specifying in advance a unit expression such as "One" and "minutes" or a length and a weight, a predetermined number of words at a predetermined interval before and after these unit expressions (for example, the number of characters) is extracted from a document in step S10 and step S11 of FIG. 4.

Figure 4:
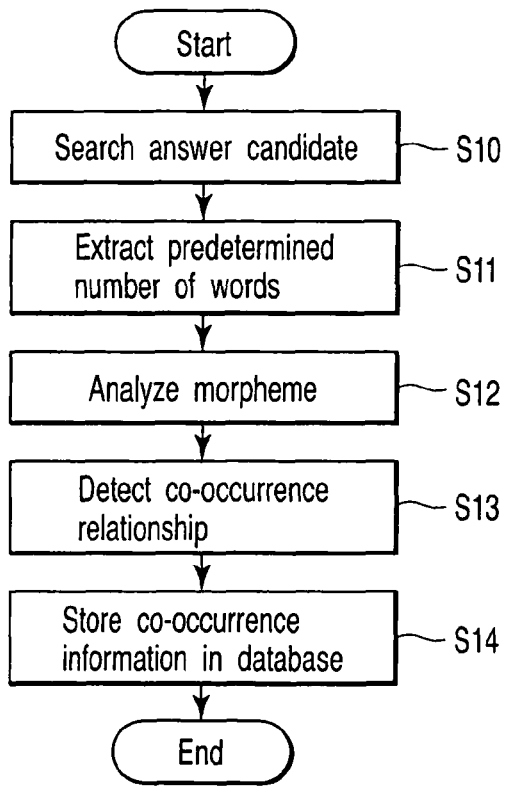
FIG. 4 is a flow chart showing a document analyzing processing.
Figure 5:
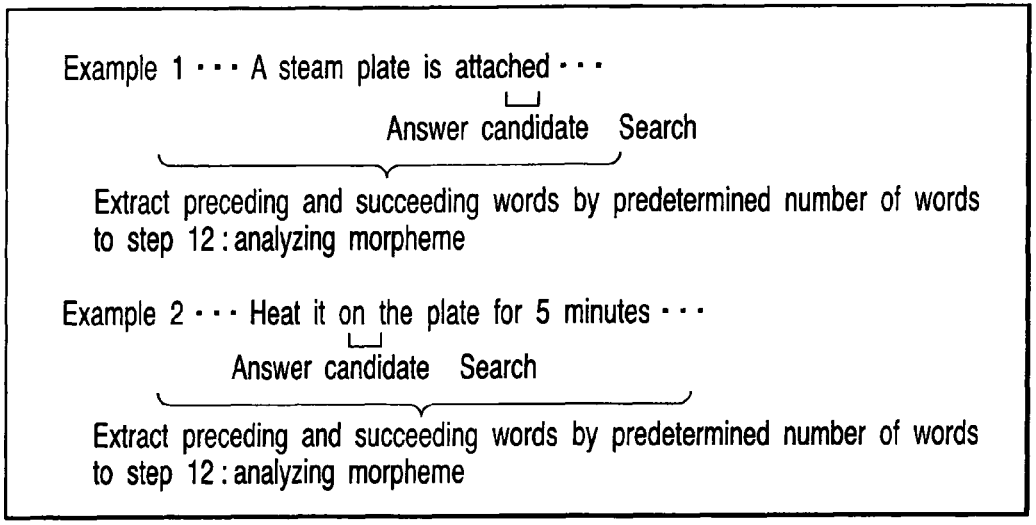
FIG. 5 is a view adopted to illustrate an answer candidate search processing and a word extracting process.

Now, as shown in FIG. 4, the document analyzing section 101 decomposes the extracted words into morphemes, and analyzes its part of speech (step S12). Morpheme analysis is a process which has been conventionally executed in natural language processing such as machine translation. Thus, a detailed description is omitted here. Next, the document analyzing section 101 extracts a word (search term) of a predetermined part of speech (herein referred to as a noun) from the extracted words based on a result of the morpheme analysis, and an interrogative expression established in an indirect co-occurrence relationship is produced via its search term and answer candidate (step 13). The document analyzing section 101 stores in the co-occurrence information database 11 the search term and interrogative expression to be associated with each other (step S14).

Figure 6:
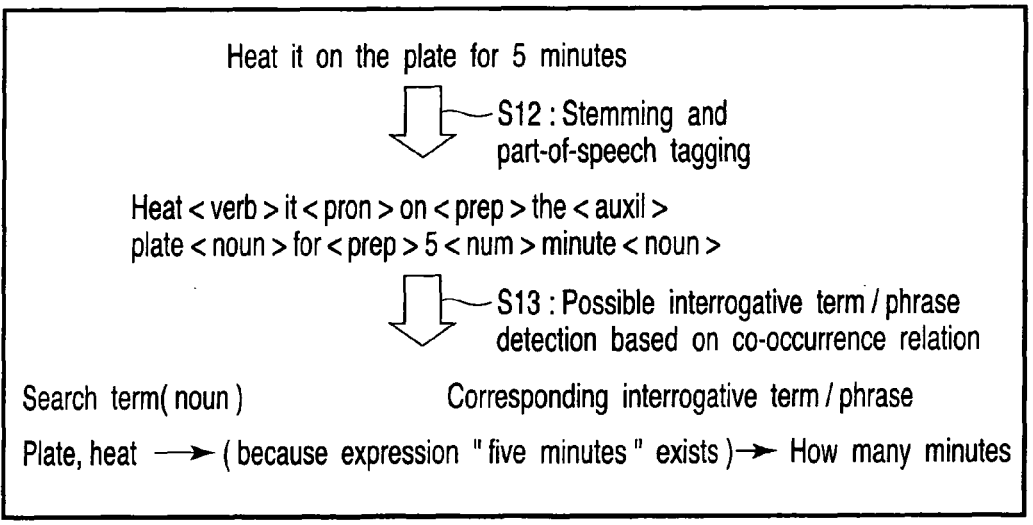
FIG. 6 is a view adopted to illustrate a morpheme analyzing processing and a co-occurrence relationship extracting processing.

For example, as shown in FIG. 6, when the extracted words "Heat it on the plate for 5 minutes." is subjected to morpheme analysis, the analysis result is "Heat<verb> it<pron> on<prep> the<auxil> plate<noun> for<prep>5<num> minute<noun>.", and nouns "plate" and "heat" are extracted from among the morpheme (corresponding to step S12). In this case, from an expression associated with an answer "five minutes" in the extracted words, an interrogative expression "How many times" is generated based on "How many" with the unit of answer "minutes", and the search term and the interrogative expression are associated with each other, and the associated words are stored in the co-occurrence information database DB 11 (corresponding to step S13).

That is, in the case of the present embodiment, an interrogative expression is automatically generated by combining "How many (much)" and the unit of answer (i.e., unit expression referred to in step S10 of FIG. 4), and the automatically generated interrogative expression is stored in the co-occurrence information database 11. With respect to association between a search term and an interrogative expression, an association rule may be prepared. For example, a category of an answer candidate is described in regular expression, and each regular expression and an interrogative expression are associated with each other. There is proposed a method for checking the answer candidates and their associated regular expression with each other, and associating with an answer candidate an interrogative expression associated with the normal expression which has been successfully checked. In addition, a search term and an interrogative expression are associated with each other, and co-occurrence information is stored in the co-occurrence information database 11 in two formats as shown in FIG. 7 so as to keep track of both of these works associated in a bi-directional manner.

Now, a description will be given with respect to a table stored in the co-occurrence information database 11. In a table 110 shown in FIG. 7, a search term and an interrogative expression are stored to be associated with each other in two formats. In a first format, a plurality of search terms is associated with one interrogative expression. In a second format, a plurality of interrogative expressions is associated with one search term. For example, in the first format, search terms "plate, steam, . . . " are stored with respect to an interrogative expression "how many". In the second format, interrogative expressions "how many, how many minutes, how many hours, etc. are stored with respect to a search term "plate". According to the example shown in FIG. 6, the interrogative expression "how many minutes" is generated from the extracted search terms "plate, oven, bacon". Thus, in the first format, the search terms "plate, oven, bacon" are stored with respect to the interrogative expressions "how many minutes", and in the second format, the interrogative expression "how many minutes" is stored with respect to each one of the search terms "plate", "oven" and "bacon".

Now, a description will be given with respect to a question adding processing using the question modifying section 103 with reference to FIGS. 8 to 10. In FIG. 8, first, the question modifying section 103 checks whether or not a search term shown in FIG. 7 is included in text information, and lists interrogative expressions corresponding to that search term from the co-occurrence information shown in FIG. 7 (step S20). The question modifying section 103 measures similarity on words between the listed interrogative expressions and expressions contained in the text information, and selects an interrogative expression which has been successfully checked at the similarity equal to or greater than a predetermined threshold value (step S21).

The similarity on the words is obtained by:

Similarity $S=1-(d/L)$ where the number of characters for the interrogative expression is L based on an edit distance "d" between phonetic symbols of both of these words.

The whole text information is checked against an interrogative expression, and the similarity between an interrogative expression contained in partial words of text information and words having the maximum similarity is defined as similarity between the interrogative expression and the text information. This can be achieved by checking an interrogative expression against partial words obtained by shifting a question sentence from the beginning by one word and stopping calculation of the similarity when the check process has reached the end of the interrogative expression. In this manner, the above described "d" is equal to or smaller than L, and the similarity S is obtained as a value between 0 and 1.

Figure 9:
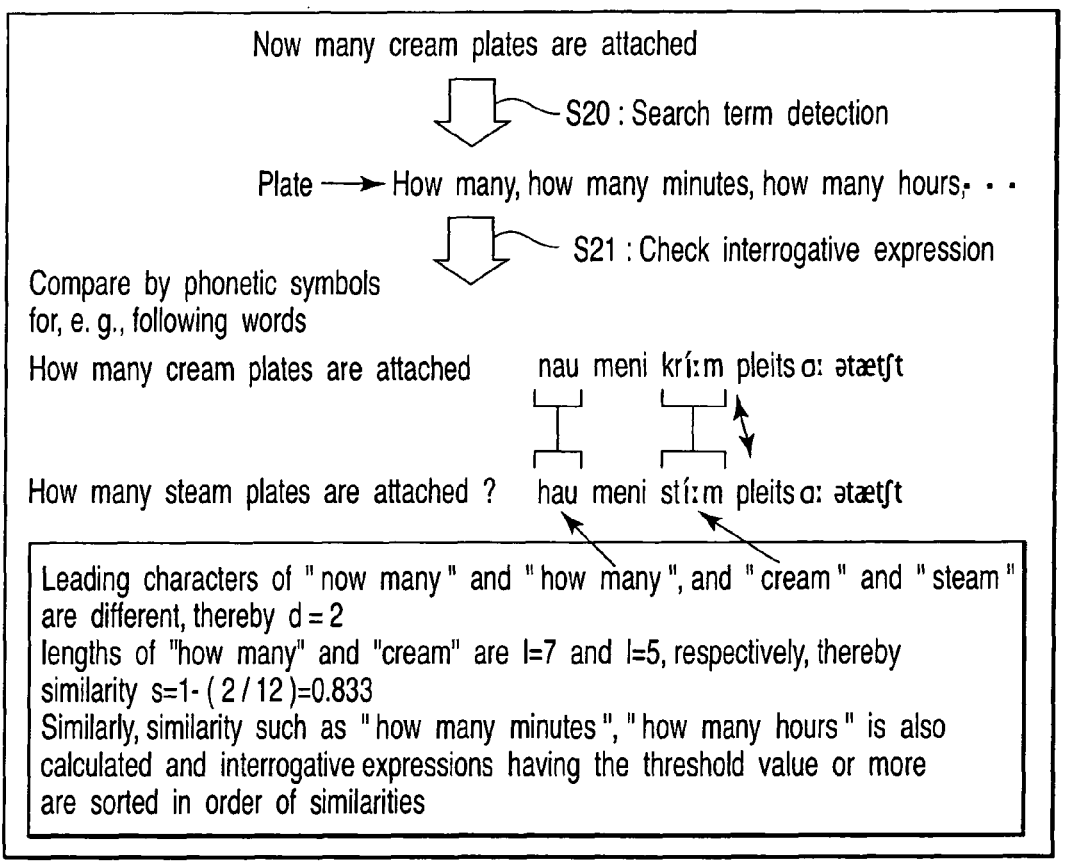
FIG. 9 is a view illustrating a search term detecting processing and an interrogative expression checking processing.
Figure 10:
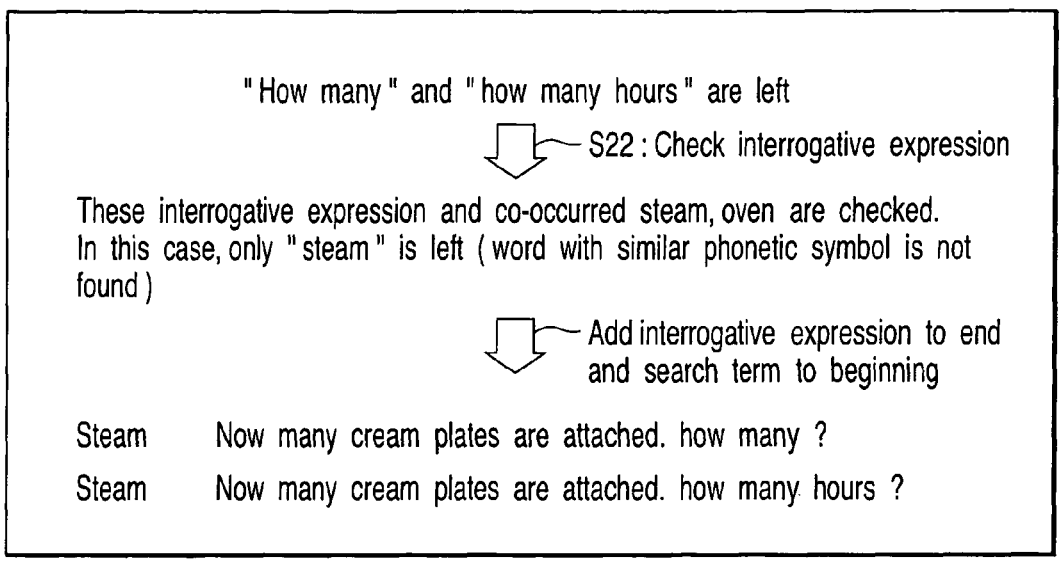
FIG. 10 is a view adopted to illustrate a search term checking processing.

For example, as shown in FIG. 9, a search term included in text information "Now many cream plates are attached." is extracted; and interrogative expressions "how many, how many minutes, how many hours etc., . . . " are listed from the extracted search term "plate" by referring to the co-occurrence information database 11 (corresponding to step S20). Next, from among the listed interrogative expressions, first, the phonetic symbols between text information and interrogative expressions are compared. In this case, leading characters of "now many" and "how many", and "cream" and "steam" are different, thereby d=2 is obtained. Therefore, since the lengths of "how many" and "cream" are l=7 and l=5, respectively, the similarity S=1−(2/12)=about 0.833. Similarly, similarity such as "how many minutes", "how many hours" is also calculated. In this example, words "how many" and "how many hours" are left. These interrogative expression and co-occurred steam, oven are checked. In this case, only "steam" is left (word with similar phonetic symbol is not found). Similarly, the similarities with respect to other interrogative expressions are obtained and the above interrogative expressions having the threshold value or more are sorted in order of similarities (corresponding to step S21).

Figures 7, 8:
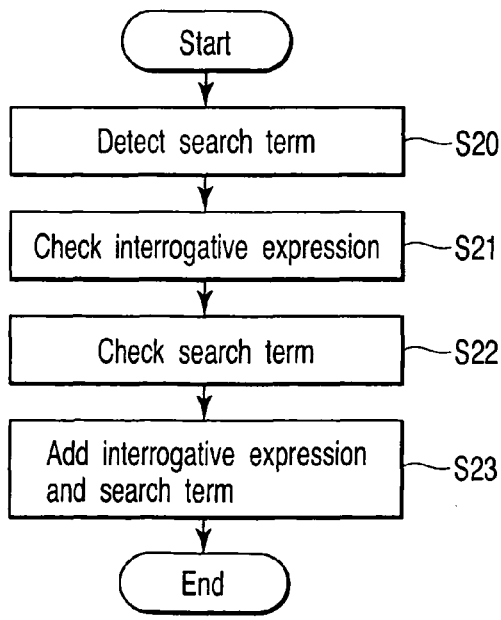
FIG. 7 is a view showing a table stored in a co-occurrence information database.
FIG. 8 is a flow chart showing a question adding processing.

Referring again to FIG. 8, when the question modifying section 103 has found out an interrogative expression whose similarity is equal to or greater than a predetermined similarity, the corresponding search terms are listed from the co-occurrence information shown in FIG. 7 based on these interrogative expressions. As is the case with an interrogative expression, the question modifying section 103 checks a search term and text information with each other, and selects any of the search terms having their predetermined or higher similarities (step S22). Lastly, the question modifying section 103 adds the selected interrogative expression to the end of the text information, and adds the search term to the beginning of the text information (step S23). However, if an interrogative expression or a search term to be added is included in the text information indicating a speech recognition result from the start, no word is added.

For example, as a result of checking between the text information and the interrogative expression using the question modifying section 103, assume that three interrogative expressions "how many, how many minutes, how many hours" are left. From the co-occurrence information shown in FIG. 7, the search terms "bacon, steam, oven, steam, heat" which co-occur with these interrogative expressions are checked with the text information. For clarity, as the result, assume that only the search term "steam" via the interrogative expressions "how many, how many minutes" has the similarity equal to or greater than a predetermined threshold value and has been left through check with the text information. The question modifying section 103 adds the obtained interrogative expression to the end of the text information, and adds the search term to the beginning of the text information. At this time, interrogative information and search terms are added for each interrogative expression. For example, in the case of the interrogative expression "how many", the search term "steam" is added to the beginning of the text information, and the interrogative expression "how many" is added to the end thereof. However, in the case of the interrogative information "how many hours", the interrogative information "how many hours" and the search term "steam" do not co-occur, and thus, the search term "steam" is not added to the beginning of the text information.

Further, after the processing operation has been made by using the question modified in section 103, the search section 104 refers to the document database 10 having the text information targeted for search stored therein, and searches an answer based on the text information obtained after the processing operation of the question modifying section 103. In the case where an interrogative expression is included in the text information, a question answering type search is executed. In the case where the interrogative expression is not included, a conventional document search is executed.

In the case where the interrogative expression is included in the text information, the question answering type search first specifies type of answer based on the interrogative expression. The type of answer used herein denotes type of expression to be outputted as an answer such as a weight or a length. Next, after a conventional document search such as a vector space method has been executed for the document database 10 based on the text information, the upper document groups are scanned as a result of that search, and a word of an answer candidate matching the above specified types of answer is extracted. Lastly, the words of the extracted answer candidates are ranked based on a distance (distance whose unit is proximity of a appearance position, for example, the number of characters) relevant to hit words contained in the same document (word contained in text information and appearing in document), and a first place word is outputted as an answer. The information contained in a document in which an answer on the search result screen shown in FIG. 12 appears will be described with reference to a region 53. From the character groups before and after a hit word "steam plate" appearing in the document, a word "One" regarding to "how many" which is the closest to that "steam plate" is outputted as an answer (excluding the character group with a line feed from a target for scanning).

At this time, what is added to an answer includes document information (such as document ID) having the highest search score of a document search for text expression of a question from among the documents including such an answer. In the case where an interrogative expression for specifying an answer is not included in the text information, a conventional document search is executed, and document information on a document whose search score is the highest is provided.

Next, a description will be given with respect to a case in which an answer or the like has been provided, i.e., with respect to the search result screen according to the first embodiment displayed on the display device 203. A search result screen 60 shown in FIG. 11 displays: a region 61 in which text information on a speech recognition result is to be displayed; a search button 62 for searching an answer to a spoken question; a clear button 63 for clearing the speech recognition result of the region 61; a region 64 for displaying text information including an interrogative expression and an answer thereof in descending order of similarity; and a region 66 for displaying the information contained in a document in which an answer searched from the speech recognition result appears. In the region 64, the text information having the interrogative expression as shown in FIG. 10 added thereto is displayed in descending order of similarity. At this time, when the search button 62 is selected, each one of the answers is displayed at the right side of the region 64 in a state in which a link is established. Further, the information contained in the document in which the searched answer appears as usual is displayed in the region 66 based on the text information on the speech recognition result displayed in the region 61. Even if the search button 62 is not selected, if vocalization is not carried out for a predetermined time interval, the text information obtained by adding an interrogative expression to the speech recognition result of the region 61 and its relevant answer may be displayed in the region 64. In addition, the information contained in the document searched based on the text information contained in the region 61 may be displayed in the region 66.

Figure 11:
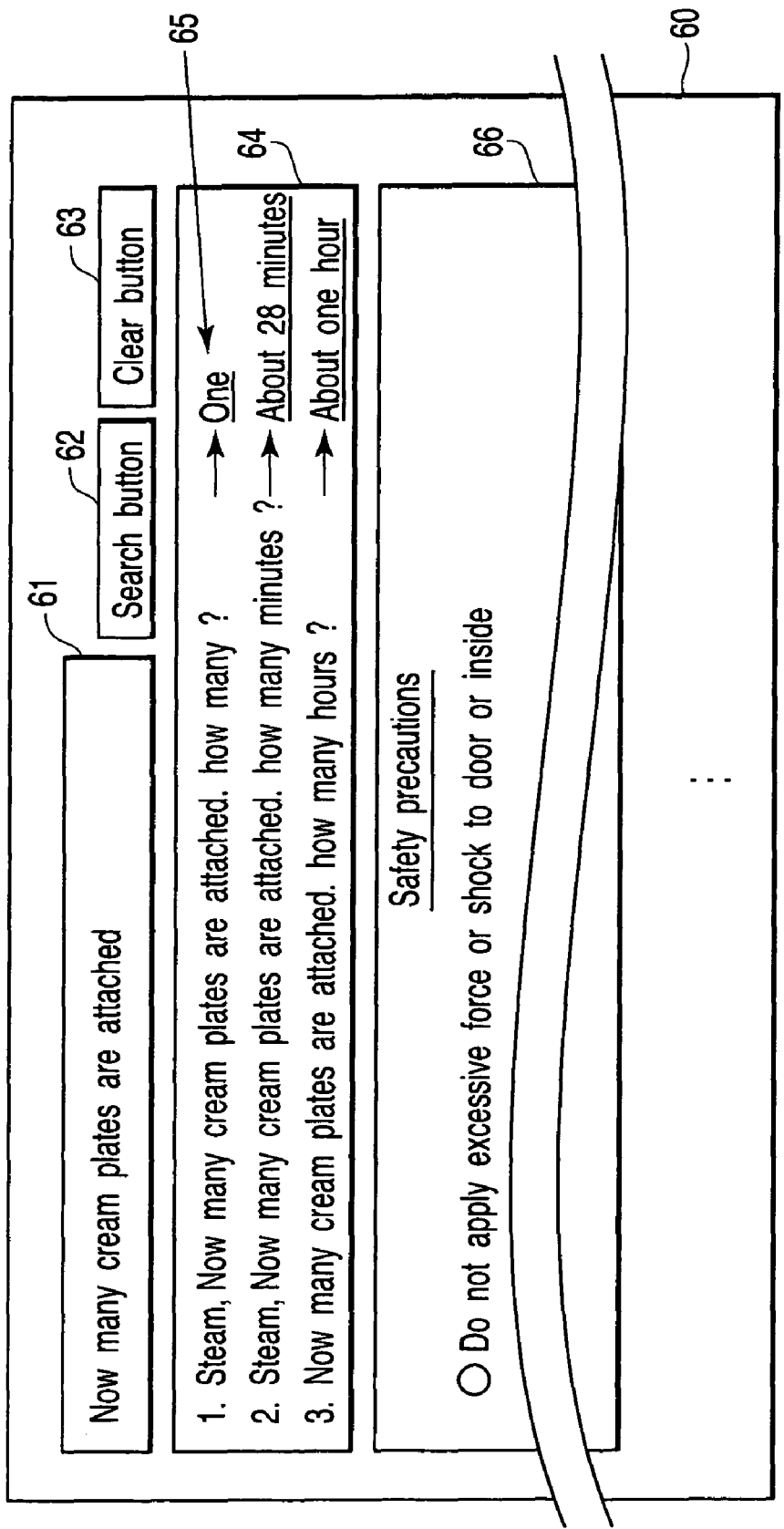
FIG. 11 is a view showing a search result screen according to the first embodiment.

The search result screen 60 shown in FIG. 11 is achieved on the Web browser. By selecting an answer at which a link displayed in the region 64 has been established, a page on which such an answer is included is displayed while keeping track of a hyper link. For example, when a selection is made for an answer result "One" at which the link of the region 65 has been established, the screen shown in FIG. 12 is displayed.

The search result screen 60 is thus configured, thereby making it possible to identify both of a case in which an interrogative expression has been correctly added to text information and a case in which an incorrect interrogative expression has been added and to improve functionality of searching information.

Figures 12, 13:
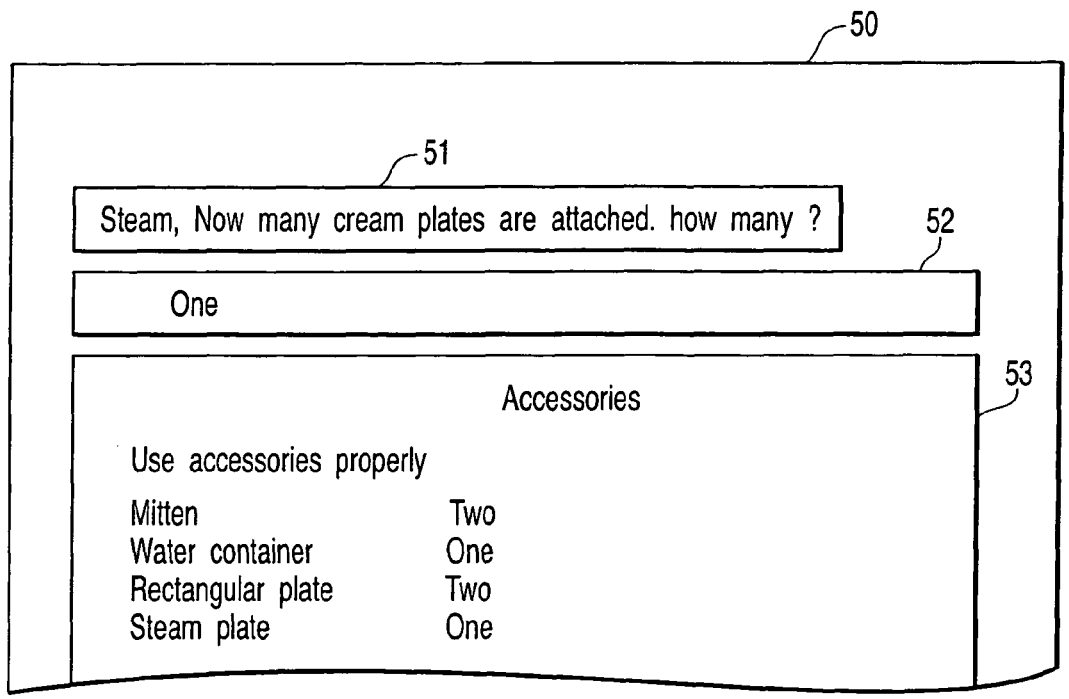
FIG. 12 is a view showing a search result screen according to the first embodiment.
FIG. 13 is a view showing a table stored in a co-occurrence information database according to a second embodiment.

FIG. 12 shows a search result screen displayed in the case where the region 65 shown in FIG. 11 has been selected. A search result screen 50 shown in FIG. 12 displays: a region 51 for displaying text information on a speech recognition result or text information including co-occurrence information; a region 52 for displaying an answer of a search result; and a region 53 for displaying the information contained in a document in which an answer appears. In the example of FIG. 11, an answer to the question modified as "steam, Now many cream plates are attached. how many?" is displayed as "One" in the region 52, and a page having the highest search score from among the pages on which the answer has been described is displayed in the region 53.

In this way, a search is made by adding an interrogative expression and a search term to text information recognized as a voice, whereby, even if a recognition error occurs with a voice input of a question, a proper answer can be provided to a user by searching it. Further, a page on which the answer has been described is displayed at the same time, thus making it possible to check another item of information relating to the question, for example, whether or not the answer to the question is precise.

Second Embodiment

Now, an information retrieval system according to a second embodiment will be described here. The information retrieval system according to the second embodiment is greatly different from the information retrieval system according to the first embodiment in that an interrogative expression candidate existing in the next candidates is replaced with a first candidate of speech recognition by using the next candidate information of speech recognition in a document analyzing section 101. That is, the information retrieval system according to the second embodiment is different from the information retrieval system according to the first embodiment in that part of text information is modified based on co-occurrence information without adding co-occurrence information such as an interrogative expression or a search term.

Now, a processing operation in the information retrieval system according to the second embodiment will be described here. The information retrieval system according to the second embodiment has the same configuration as the information retrieval system according to the first embodiment. First, a question sentence caused by a voice vocalized from a user is recognized by means of a speech recognition section 102, and then, is converted to text information. A control section 105 acquires text information on a recognition result from the speech recognition section 102, and provides it to a question modifying section 103. The question modifying section 103 acquires a next candidate relating to each word which configures the text information from the speech recognition section 102. A search section 104 searches an answer based on a result of the question modifying section 103. It is not necessary that only one next candidate is present with respect to each word which configures text information, and a plurality of candidates may be present. The question modifying section 103 does nothing if any interrogative expression or search term is included in the text information from the start, and provides the text information to the search section 104 as it is. In addition, the question modifying section 103 also does nothing in the case where no interrogative expression or search term is included in text information and no interrogative expression is included in any of the next candidates, and provides the text information to the search section 104 as it is. On the other hand, although no interrogative expression is included in text information, in the case where such an interrogative expression is included in the next candidate, the next candidate of text information is scanned, and the first found interrogative expression is replaced with the corresponding portion of the next candidate, thereby modifying the text information and providing a result of the modification. In the information retrieval system according to the second embodiment, detecting a search term in step S20, checking an interrogative expression in step S21, and checking a search term in step S22 are carried out from among the question modification processing operations of FIG. 8, and adding an interrogative expression or a search term in step S23 is not carried out. In the information retrieval system according to the second embodiment, a next candidate table outputted by the speech recognition section 102 of FIG. 1 is scanned instead of adding an interrogative expression or a search term in step S23. If an interrogative expression or a search term which is a result of checking an interrogative expression in step S21 or checking a search term in step S22 exists as a next candidate, that next candidate is replaced with the corresponding portion of the recognition result.

In this way, the text information recognized as a voice is modified in a format which is natural for a user, whereby a search can be easily made for a proper answer.

Figure 14:
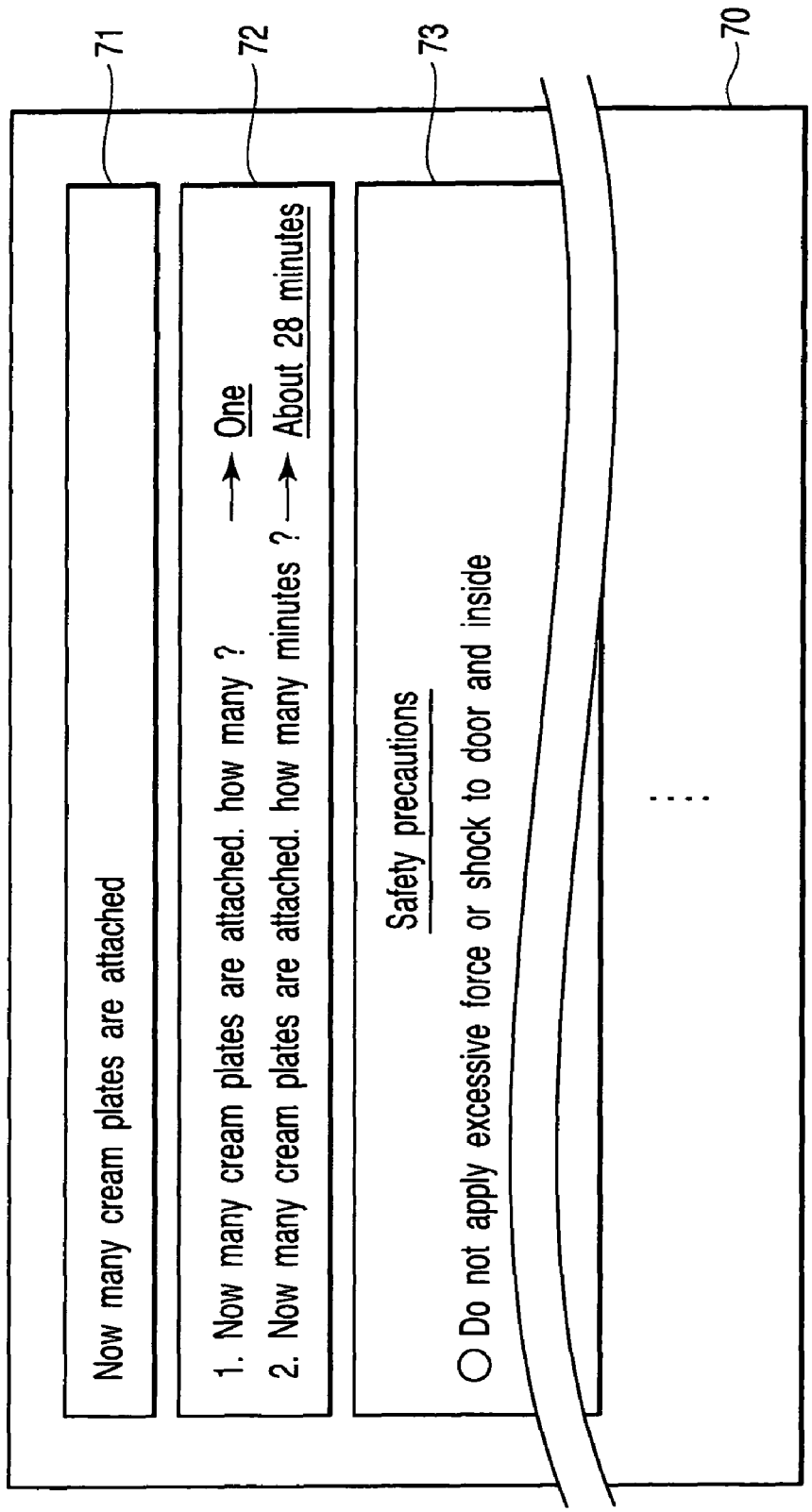
FIG. 14 is a view showing a search result screen according to the second embodiment.

Now, a next candidate table outputted by the speech recognition section 102 will be described here. A table 120 shown in FIG. 13 shows only the next candidate relevant to each word of the text information recognized as a voice. For example, a next candidate "mill, mild, steam, etc. . . . " or the like is stored with respect to a word "milk". In the cases illustrated in FIGS. 9 and 10, in the information retrieval system according to the second embodiment, the question modifying section 103 modifies the text information word "milk" to "mill" because the word "milk" is a search term "steam" which has been successfully checked in the next candidates. Further, the question modifying section 103 modifies the text information word "now many" to "how many" or "how many minutes" because the word "now many" includes "how many" and "how many minutes" in the next candidates. The text information modified by the question modifying section 103 is displayed on a search result screen shown in FIG. 14.

Next, a search result screen according to the second embodiment will be described here. A search result screen 70 shown in FIG. 14 displays: a region 71 for displaying text information on a speech recognition result or text information which includes co-occurrence information; a region 72 for displaying text information which includes co-occurrence information and its answer in descending order of similarity; and a region 73 for displaying the contents of a document in which an answer searched from the speech recognition result appears. In comparison between the region 72 shown in FIG. 14 and the region 64 shown in FIG. 11, the text information including an interrogative expression "how many minutes" displayed in the region 64 is not displayed in the region 72 because the information does not appear in the next candidate in the second embodiment.

As mentioned above, co-occurrence information is added to the text information recognized as a voice, and a search is made for an answer from the co-occurrence information, whereby, even in the case where a recognition error occurs in a question voice input, a proper answer can be provided to the user by searching it.

The information retrieval processing operation described in the above embodiment can be achieved by hardware and can be executed by software using a computer. That is, according to the present invention, there can be provided a program causing a computer to execute a database search processing operation which includes making speech recognition for a spoken question to generate first text information; modifying the first text information to generate an interrogative expression for introducing an answer to the question and second text information which includes the interrogative expression; and searching a document database by using the second text information to extract an answer.

According to the present invention, even in the case where a recognition error occurs in a voice input of a question, a proper answer can be provided to the user by searching it. Further, the present invention can reduce a time required for answer after starting a search or a cost associated with the search processing.

Additional advantages and modifications will readily occur to those skilled in the art. Therefore, the invention in its broader aspects is not limited to the specific details, representative devices, and illustrative examples shown and described herein. Accordingly, various modifications may be made without departing from the spirit or scope of the general inventive concept as defined by the appended claims and their equivalents.

What is claimed is:

1. An information retrieval method, comprising:
    storing, in a co-occurrence information database, co-occurrence information associating a word of a predetermined part of speech and an interrogative expression with each other, the word of the predetermined part of speech being extracted as a search term from a word stream including a unit expression becoming an answer candidate in each document stored in a document database and the interrogative expression being generated by combining "How many (much)" and the unit expression;
    performing speech recognition for a spoken question to generate text information;
    detecting the search term from the text information;
    selecting, from a plurality of interrogative expressions corresponding to the detected search term, an interrogative expression indicating a similarity equal to or greater than a threshold value with respect to a word in the text information, and correcting the text information by adding the selected interrogative expression to the text information; and
    searching the document database by using the corrected text information, and extracting, from each document obtained as a search result, a word matching a type of the unit expression included in the interrogative expression in the corrected text information, as a response.

2. An information retrieval method, comprising:
    storing, in a co-occurrence information database, co-occurrence information associating a word of a predetermined part of speech and an interrogative expression with each other, the word of the predetermined part of speech being extracted as a search term from a word stream including a unit expression being an answer candidate in each document stored in a document database, and the interrogative expression being generated by combining "How many (much)" and the unit expression;
    performing speech recognition for a spoken question to generate text information;
    storing, in a next candidate memory, a word stream of a next candidate for speech recognition that is obtained with the speech recognizer about a word configuring the text information;
    selecting, from a plurality of interrogative expressions corresponding to the detected search term, an interrogative expression indicating a similarity equal to or greater than a threshold value with respect to the next candidate of a word in the text information;
    correcting the text information by replacing the word of the text information with the next candidate, the text information including no interrogative expression corresponding to the detected search term; and
    searching the document database by using the text information and deriving from each document obtained as a search result a word matching a type of the unit expression included in the interrogative expression in the text information, as a response.

3. An information retrieval apparatus, comprising:
    a co-occurrence information database to store co-occurrence information associating a word of a predetermined part of speech and an interrogative expression with each other, the word of the predetermined part of speech being extracted as a search term from a word stream including a unit expression becoming an answer candidate in each document stored in a document database and the interrogative expression being generated by combining "How many (much)" and the unit expression;
    a speech recognition unit to perform speech recognition for a spoken question to generate text information;
    a detection unit to detect the search term from the text information;
    a selector unit to select, from a plurality of interrogative expressions corresponding to the detected search term, an interrogative expression indicating a similarity equal to or greater than a threshold value with respect to a word in the text information, and correct the text information by adding the selected interrogative expression to the text information; and
    a search unit to search the document database by using the corrected text information and extract, from each document obtained as a search result, a word matching a type of the unit expression included in the interrogative expression in the corrected text information, as a response.

4. An information retrieval apparatus, comprising:
    a co-occurrence information database to store co-occurrence information associating a word of a predetermined part of speech and an interrogative expression with each other, the word of the predetermined part of speech being extracted as a search term from a word stream including a unit expression being an answer candidate in each document stored in a document database and the interrogative expression being generated by combining "How many (much)" and the unit expression;
    a speech recognition unit to perform speech recognition for a spoken question to generate text information;
    a next candidate memory to store a word stream of a next candidate for speech recognition that is obtained with the speech recognizer about a word configuring the text information;
    a selector to select from a plurality of interrogative expressions corresponding to the detected search term, an interrogative expression indicating a similarity equal to or greater than a threshold value with respect to the next candidate of a word in the text information;

a correction unit to correct the text information by replacing the word of the text information with the next candidate, the text information including no interrogative expression corresponding to the detected search term; and a search unit to search the document database by using the text information and derive from each document obtained as a search result a word matching a type of the unit expression included in the interrogative expression in the text information, as a response.

5. A computer readable storage medium storing instructions of a computer program which, when executed by a computer, causes the computer to perform a method comprising:

storing, in a co-occurrence information database, co-occurrence information associating a word of a predetermined part of speech and an interrogative expression with each other, the word of the predetermined part of speech being extracted as a search term from a word stream including a unit expression becoming an answer candidate in each document stored in a document database and the interrogative expression being generated by combining "How many (much)" and the unit expression;

performing speech recognition for a spoken question to generate text information;

detecting the search term from the text information;

selecting, from a plurality of interrogative expressions corresponding to the detected search term, an interrogative expression indicating a similarity equal to or greater than a threshold value with respect to a word in the text information, and correct the text information by adding the selected interrogative expression to the text information; and searching the document database by using the corrected text information and extracting, from each document obtained as a search result, a word matching a type of the unit expression included in the interrogative expression in the corrected text information, as a response.

6. A computer readable storage medium storing instructions of a computer program which, when executed by a computer, causes the computer to perform a method comprising:

storing, in a co-occurrence information database, co-occurrence information associating a word of a predetermined part of speech and an interrogative expression with each other, the word of the predetermined part of speech being extracted as a search term from a word stream including a unit expression being an answer candidate in each document stored in a document database and the interrogative expression being generated by combining "How many (much)" and the unit expression;

performing speech recognition for a spoken question to generate text information;

storing, in a next candidate memory, a word stream of a next candidate for speech recognition that is obtained with the speech recognizer about a word configuring the text information;

selecting, from a plurality of interrogative expressions corresponding to the detected search term, an interrogative expression indicating a similarity equal to or greater than a threshold value with respect to the next candidate of a word in the text information;

correcting the text information by replacing the word of the text information with the next candidate, the text information including no interrogative expression corresponding to the detected search term; and searching the document database by using the text information and deriving from each document obtained as a search result a word matching a type of the unit expression included in the interrogative expression in the text information, as a response.

* * * * *